United States Patent
Doering et al.

(10) Patent No.: US 9,238,457 B2
(45) Date of Patent: Jan. 19, 2016

(54) METHOD FOR CONTROLLING A TRANSMISSION COUPLED TO AN ENGINE THAT MAY BE AUTOMATICALLY STOPPED

(71) Applicant: Ford Global Technologies, LLC, Dearborn, MI (US)

(72) Inventors: Jeffrey Allen Doering, Canton, MI (US); Steve Michael Cicala, Dearborn Heights, MI (US); Alex O'Connor Gibson, Ann Arbor, MI (US); Felix Nedorezov, Rochester Hills, MI (US); Eric Frank Banners, Plymouth, MI (US); Hong Jiang, Birmingham, MI (US); Donald G. Levens, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/520,164

(22) Filed: Oct. 21, 2014

(65) Prior Publication Data

US 2015/0038294 A1 Feb. 5, 2015

Related U.S. Application Data

(63) Continuation of application No. 13/348,587, filed on Jan. 11, 2012, now Pat. No. 8,864,623, which is a continuation-in-part of application No. 12/833,788, filed on Jul. 9, 2010, now Pat. No. 8,328,687.

(51) Int. Cl.
*B60W 10/02* (2006.01)
*F02N 11/08* (2006.01)
(Continued)

(52) U.S. Cl.
CPC ............. *B60W 10/02* (2013.01); *B60W 10/023* (2013.01); *B60W 10/06* (2013.01); *B60W 10/10* (2013.01); *B60W 10/11* (2013.01); *B60W 10/184* (2013.01); *B60W 30/18018* (2013.01); *F02N 11/0814* (2013.01); *B60W 2510/107* (2013.01); *B60W 2510/182* (2013.01); *B60W 2550/12* (2013.01); *B60W 2560/06* (2013.01);
(Continued)

(58) Field of Classification Search
CPC ... B60W 10/02; B60W 10/023; B60W 10/06; B60W 10/10; B60W 10/11; B60W 10/184; B60W 30/18018; B60W 2510/107; B60W 2550/12; B60W 2560/06; B60W 2710/1083; F02N 11/0814; Y10T 477/638; Y10T 477/656; Y10T 477/753; Y10T 477/78; F16H 61/0059; F16H 2312/04; F16H 2312/14; Y02T 10/48
See application file for complete search history.

(56) References Cited

U.S. PATENT DOCUMENTS 4,362,133 A 12/1982 Malik
4,539,643 A 9/1985 Suzuki et al.
(Continued)

FOREIGN PATENT DOCUMENTS

DE 102006018960 A1 10/2007
EP 0848159 A1 6/1998
(Continued)

*Primary Examiner* — Jacob S Scott
(74) *Attorney, Agent, or Firm* — James Dottavio; Alleman Hall McCoy Russell & Tuttle LLP

(57) ABSTRACT

Methods and systems for controlling a transmission coupled to an engine during an engine start are presented. In one example, a method adjusts a transmission tie-up force in response to an indication of transmission slip. The method may improve vehicle launch for stop/start vehicles.

19 Claims, 5 Drawing Sheets

(51) Int. Cl.
  *B60W 10/11* (2012.01)
  *B60W 30/18* (2012.01)
  *B60W 10/06* (2006.01)
  *B60W 10/184* (2012.01)
  *F16H 61/00* (2006.01)
  *B60W 10/10* (2012.01)

(52) U.S. Cl.
  CPC ... *B60W 2710/1083* (2013.01); *F16H 61/0059* (2013.01); *F16H 2312/04* (2013.01); *F16H 2312/14* (2013.01); *Y02T 10/48* (2013.01); *Y10T 477/638* (2015.01); *Y10T 477/656* (2015.01); *Y10T 477/753* (2015.01); *Y10T 477/78* (2015.01)

(56) References Cited

U.S. PATENT DOCUMENTS

| | | | |
|---|---|---|---|
| 5,004,084 | A | 4/1991 | Mehr-Ayin et al. |
| 5,192,021 | A | 3/1993 | Meier et al. |
| 6,055,475 | A | 4/2000 | Moriyama |
| 6,093,974 | A | 7/2000 | Tabata et al. |
| 6,161,640 | A | 12/2000 | Yamaguchi |
| 6,190,284 | B1 | 2/2001 | Kuroda et al. |
| 6,257,759 | B1 | 7/2001 | Witonsky et al. |
| 6,258,008 | B1 | 7/2001 | Tabata et al. |
| 6,278,195 | B1 | 8/2001 | Yamaguchi et al. |
| 6,334,834 | B1 | 1/2002 | Mizutani et al. |
| 6,344,834 | B1 | 2/2002 | Josypenko |
| 6,364,436 | B1 | 4/2002 | Sawada |
| 6,412,617 | B1 | 7/2002 | Spijker et al. |
| 6,453,865 | B2 | 9/2002 | Hirose et al. |
| 6,463,375 | B2 | 10/2002 | Matsubara et al. |
| 6,537,178 | B1 | 3/2003 | Takizawa et al. |
| 6,546,826 | B2 | 4/2003 | Suzuki |
| 6,556,910 | B2 | 4/2003 | Suzuki et al. |
| 6,648,795 | B2 | 11/2003 | Kobayashi |
| 6,651,603 | B2 | 11/2003 | Osada et al. |
| 6,672,267 | B2 | 1/2004 | Souki et al. |
| 6,695,743 | B2 | 2/2004 | Tanaka et al. |
| 6,730,000 | B1 | 5/2004 | Leising et al. |
| 6,736,755 | B2 | 5/2004 | Kato |
| 6,754,579 | B2 | 6/2004 | Kamiya et al. |
| 6,763,903 | B2 | 7/2004 | Morimoto et al. |
| 6,834,632 | B2 | 12/2004 | Kataoka et al. |
| 6,848,552 | B2 | 2/2005 | Miller |
| 6,857,491 | B2 | 2/2005 | Wakashiro et al. |
| 6,875,154 | B2 | 4/2005 | Mitsutani et al. |
| 6,881,171 | B2 | 4/2005 | Kuhstrebe et al. |
| 6,951,525 | B2 | 10/2005 | Ries-Mueller |
| 7,040,304 | B2 | 5/2006 | Kassner |
| 7,066,128 | B2 | 6/2006 | Satake et al. |
| 7,103,468 | B2 | 9/2006 | Wakashiro et al. |
| 7,134,414 | B2 | 11/2006 | Ries-Mueller et al. |
| 7,146,960 | B2 | 12/2006 | Phlips et al. |
| 7,159,561 | B1 | 1/2007 | Kerns et al. |
| 7,191,755 | B2 | 3/2007 | Vint |
| 7,191,756 | B2 | 3/2007 | Phlips et al. |
| 7,243,011 | B2 | 7/2007 | Koenig et al. |
| 7,247,123 | B2 | 7/2007 | Ohtake et al. |
| 7,275,509 | B2 | 10/2007 | Kassner |
| 7,305,300 | B2 | 12/2007 | Gibson et al. |
| 7,316,631 | B2 | 1/2008 | Tsunekawa |
| 7,329,206 | B2 | 2/2008 | Tanaka |
| 7,406,939 | B2 | 8/2008 | Asahara et al. |
| 7,683,503 | B2 | 3/2010 | Yamaguchi |
| 7,933,711 | B1 | 4/2011 | Ulrey et al. |
| 8,112,208 | B2 | 2/2012 | McGee et al. |
| 8,398,516 | B2 | 3/2013 | Smith et al. |
| 8,579,765 | B2 | 11/2013 | Yu et al. |
| 8,591,379 | B2 | 11/2013 | Gibson et al. |
| 2003/0209373 | A1 | 11/2003 | Egami et al. |
| 2004/0153236 | A1 | 8/2004 | Itoh et al. |
| 2005/0133006 | A1 | 6/2005 | Frenz et al. |
| 2005/0279543 | A1 | 12/2005 | Seufert et al. |
| 2006/0048734 | A1 | 3/2006 | Kataoka et al. |
| 2006/0157023 | A1 | 7/2006 | Matsuki et al. |
| 2006/0272869 | A1 | 12/2006 | Hidaka et al. |
| 2007/0006831 | A1 | 1/2007 | Leone et al. |
| 2007/0078040 | A1 | 4/2007 | Nobumoto et al. |
| 2007/0114082 | A1 | 5/2007 | Nozaki et al. |
| 2007/0155584 | A1 | 7/2007 | Tabata et al. |
| 2007/0179695 | A1 | 8/2007 | Reinke et al. |
| 2007/0192018 | A1 | 8/2007 | Gibson et al. |
| 2007/0209618 | A1 | 9/2007 | Leone |
| 2007/0209619 | A1 | 9/2007 | Leone |
| 2007/0225888 | A1 | 9/2007 | Morris |
| 2007/0295475 | A1 | 12/2007 | Samie et al. |
| 2008/0254940 | A1 | 10/2008 | Stoffels et al. |
| 2008/0257619 | A1 | 10/2008 | Yamazaki |
| 2009/0018715 | A1 | 1/2009 | Kanayama |
| 2009/0020091 | A1 | 1/2009 | Botzenhard et al. |
| 2010/0174459 | A1 | 7/2010 | Gibson et al. |
| 2010/0197441 | A1 | 8/2010 | Pursifull |
| 2011/0053735 | A1 | 3/2011 | Lewis et al. |
| 2011/0054765 | A1 | 3/2011 | Lewis et al. |
| 2011/0132308 | A1 | 6/2011 | Liu et al. |
| 2011/0172890 | A1 | 7/2011 | Ulrey et al. |
| 2012/0216767 | A1 | 8/2012 | Ulrey et al. |

FOREIGN PATENT DOCUMENTS

| | | |
|---|---|---|
| EP | 1069346 A2 | 1/2001 |
| EP | 1367246 A1 | 3/2003 |
| EP | 1052401 A2 | 9/2003 |
| EP | 1344673 A2 | 9/2003 |
| EP | 1348895 A2 | 10/2003 |
| EP | 0990793 A2 | 8/2004 |
| EP | 1052400 A2 | 10/2004 |
| GB | 2448671 A | 10/2008 |
| JP | 11082088 A | 3/1999 |
| JP | 2001193540 A | 1/2001 |
| JP | 2003214210 A | 7/2003 |
| JP | 2007315316 A | 12/2007 |
| WO | 2009024305 A2 | 2/2009 |

METHOD FOR CONTROLLING A TRANSMISSION COUPLED TO AN ENGINE THAT MAY BE AUTOMATICALLY STOPPED

CROSS REFERENCE TO RELATED APPLICATIONS

The present application is a continuation of U.S. patent application Ser. No. 13/348,587, entitled "METHOD FOR CONTROLLING A TRANSMISSION COUPLED TO AN ENGINE THAT MAY AUTOMATICALLY BE STOPPED," filed on Jan. 11, 2012, now U.S. Pat. No. 8,864,623, which is a continuation-in-part of U.S. patent application Ser. No. 12/833,788, entitled "METHOD FOR CONTROLLING AN ENGINE THAT MAY BE AUTOMATICALLY STOPPED," filed on Jul. 9, 2010, now U.S. Pat. No. 8,328,687, the entire contents of each of which are hereby incorporated by reference for all purposes.

FIELD

The present description relates to methods and systems for controlling a transmission that is coupled to an engine that may be automatically stopped and started. The method may be particularly useful for engines that are stopped and then restarted while the transmission is in gear.

BACKGROUND AND SUMMARY

An input shaft of a transmission may be tied to a case of a transmission during engine starting. Tying the transmission input shaft to the transmission case allows the transmission to supply an increased load to the engine as compared to when the engine is in neutral so that engine speed may be controlled during an engine start. Additionally, less engine torque may be transmitted to vehicle wheels when the input shaft is coupled to the transmission case instead of vehicle wheels. In this way, a load may be applied to an engine to control engine speed during starting while at the same time limiting torque to accelerate the vehicle to which the engine is coupled. However, if one or more clutches tying up the transmission is supplied oil at a low pressure, the clutch may slip and cause a torque disturbance in the vehicle driveline. Alternatively, if the clutch is supplied oil at a higher pressure, it may take a longer amount of time to release the clutch so that vehicle launch may be delayed. Further, transmission temperatures as well as changes in road grade can affect whether or not a transmission tie-up clutch holds the transmission input shaft in a desired manner. Therefore, a single transmission clutch tie-up oil pressure command may not provide desirable tie-up characteristics during varying vehicle operating conditions.

The inventors herein have recognized the above-mentioned disadvantages and have developed a method for controlling a transmission coupled to an engine during an engine start, comprising: applying a first pressure to a clutch tying a transmission input shaft to a transmission case during a first engine start; and applying a second pressure to the clutch tying the transmission input shaft to the transmission case during a second engine start.

By supplying different pressures to one or more clutches tying up a transmission input shaft to a transmission case, it may be possible to provide desirable tie-up forces to couple a transmission input shaft to a transmission case during a variety of operating conditions. For example, for a transmission that includes an over-running clutch, oil pressure supplying force to a tie-up clutch (e.g., a gear clutch other than first gear clutch) can be adjusted such that the tie-up clutch force coupling the transmission input shaft to the transmission case is different for different engine and/or transmission operating conditions. During some operating conditions, oil pressure supplied to the tie-up clutch may be held at a higher pressure than during other operating conditions. For example, when a vehicle to which the transmission is coupled is stopped on a road with a grade, the road grade may be compensated for by increasing oil pressure supplied to the tie-up clutch. Similarly, during some operating conditions, oil pressure supplied to a tie-up clutch may be reduced during conditions where it takes more time than is desired to relieve the oil pressure and release the tie-up clutch. Further, the oil pressure supplied to a tie-up clutch may be adaptively changed so that different transmissions of different vehicles may tie-up and release in a similar manner even though there may be differences between transmission components.

The present description may provide several advantages. For example, the approach may reduce vehicle launch variability for engines that are automatically stopped and started. Further, the method may reduce transmission clutch wear since transmission tie-up application and release can be adjusted for operating conditions. Further still, engine emissions may be reduced as compared to systems where engine speed varies due to slipping of the transmission during transmission tie-up.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
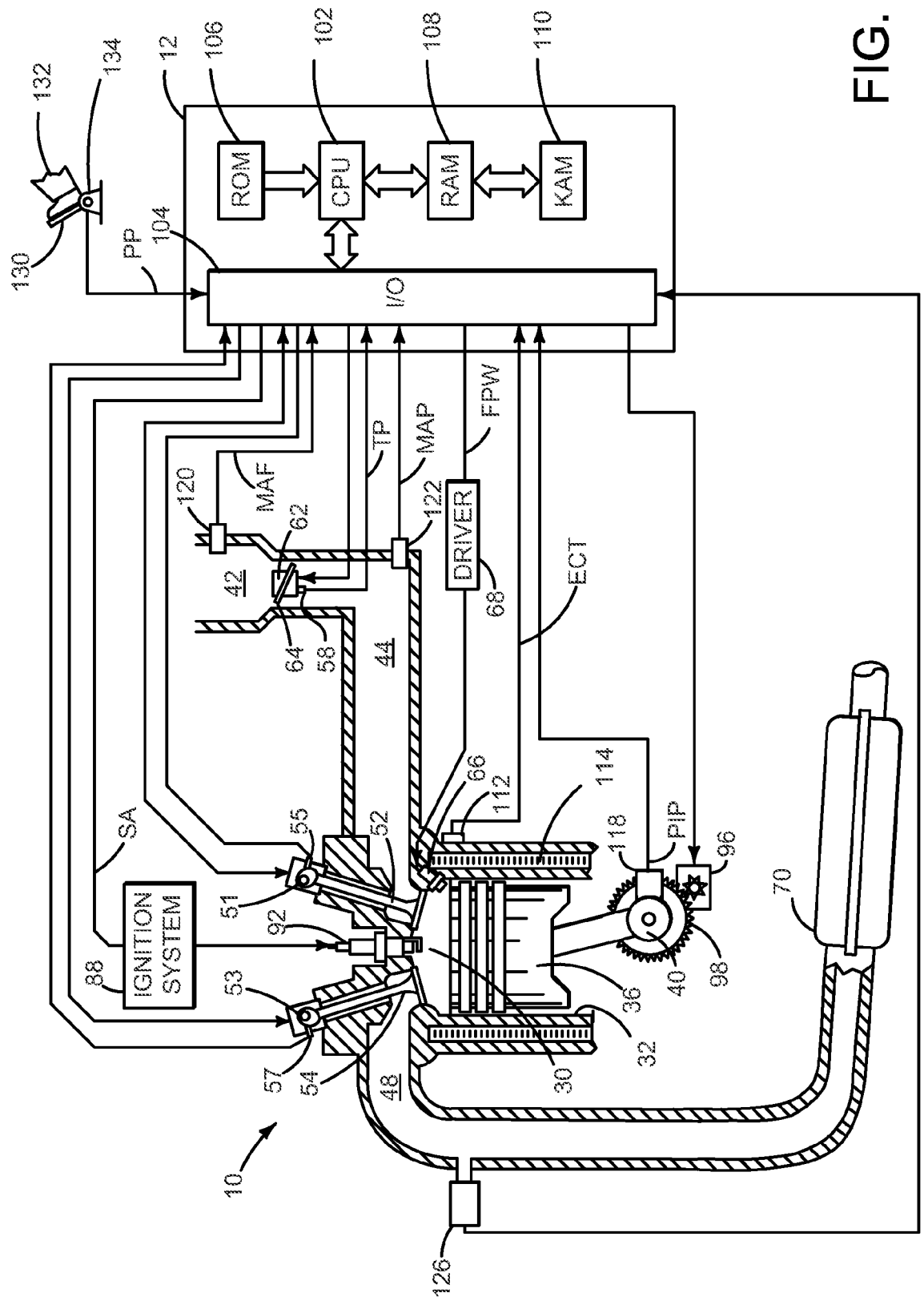
FIG. 1 is a schematic diagram of an engine.
Figure 2:
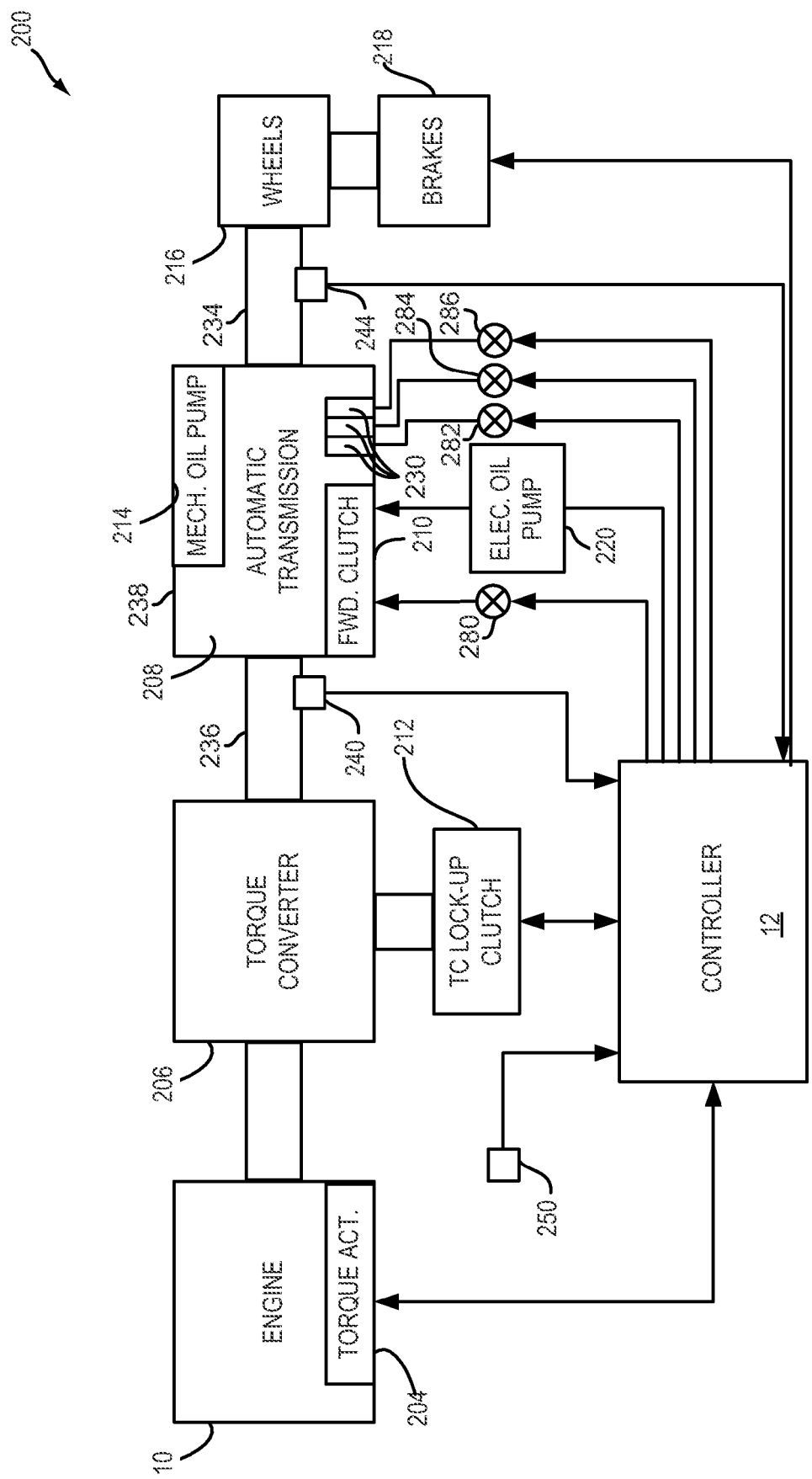
FIG. 2 is shows an example vehicle system layout.

The present description is related to controlling a transmission coupled to an automatically started engine. In one non-limiting example, the engine may be configured as illustrated in FIG. 1. Further, the engine may be part of a vehicle as illustrated in FIG. 2.

Figure 3:
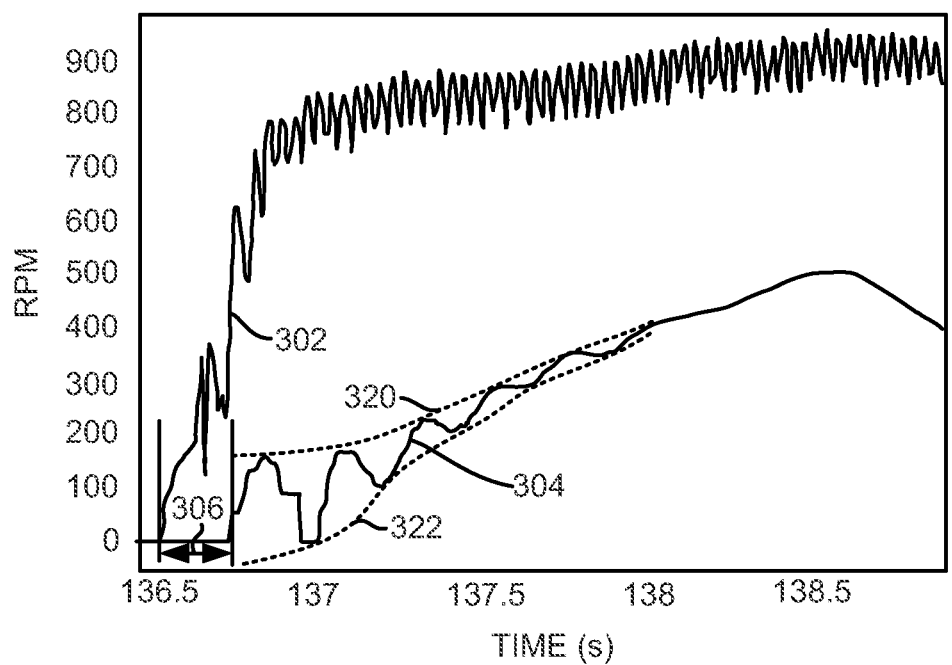
FIGS. 3-5 are example plot of signals of interest during simulated engine starts.
Figure 4:
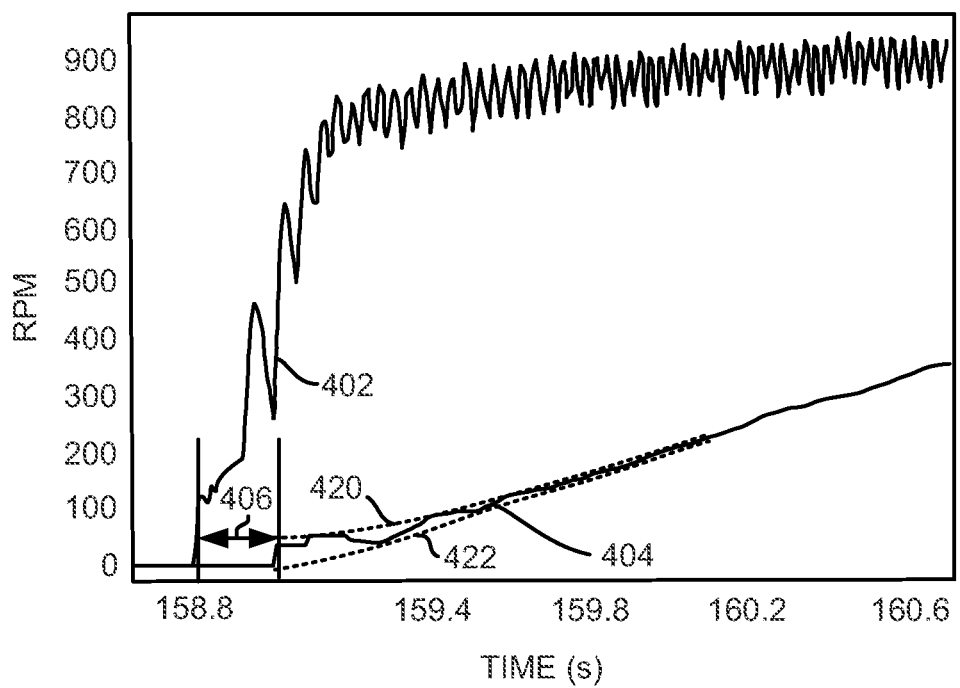
Figure 5:
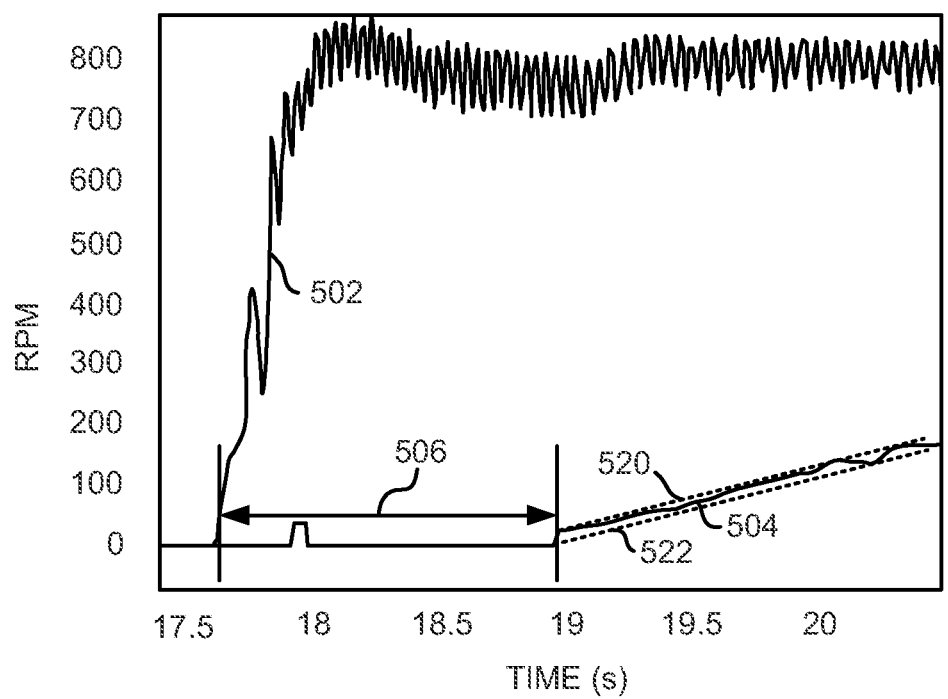
Figure 6:
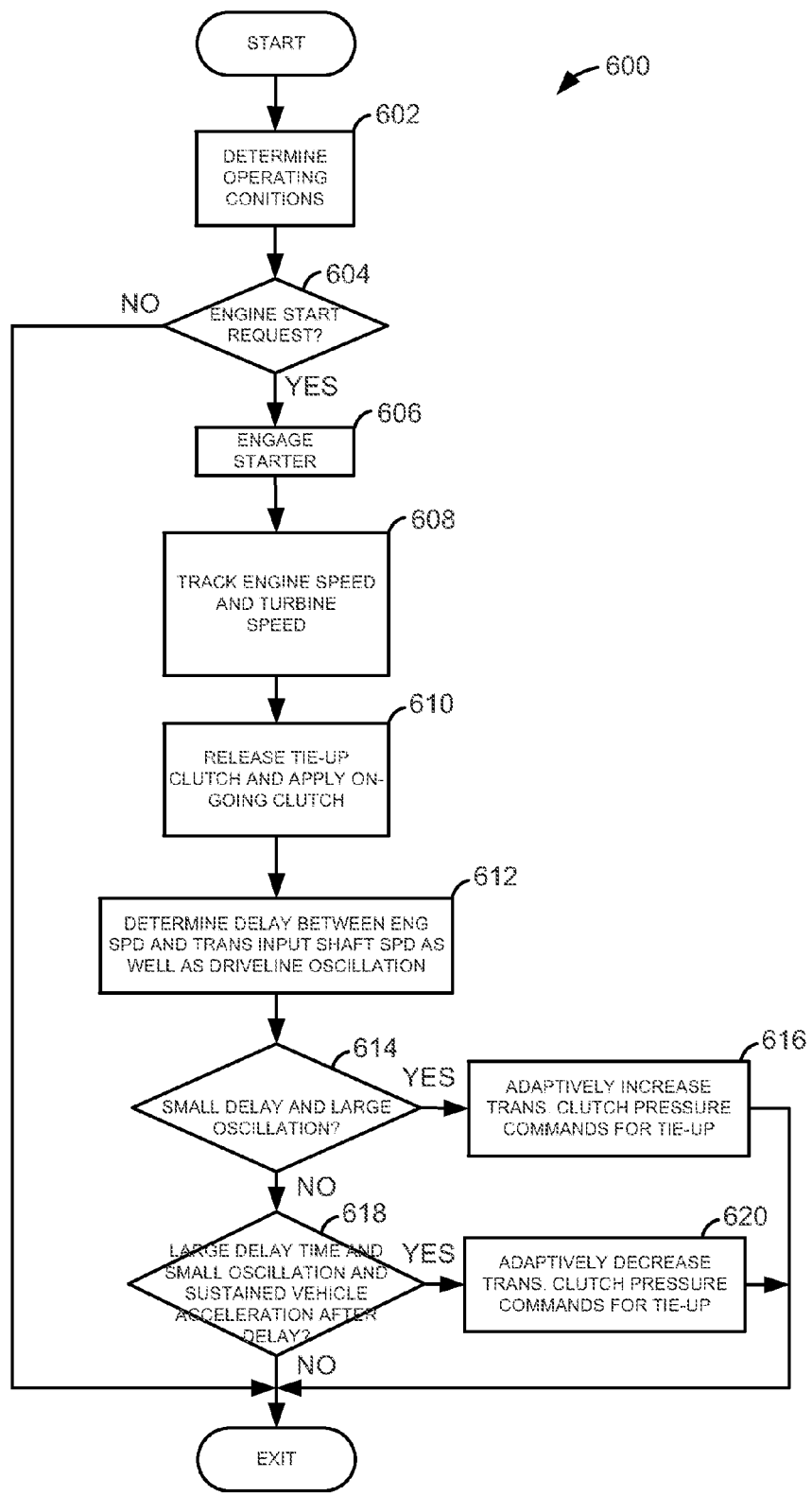
FIG. 6 is a flowchart of an example engine starting and transmission control method.

Engine starting and transmission control may be performed according to the method described by FIG. 6. The method of FIG. 6 may be used to control oil pressure supplied to one or more transmission tie-up clutches during an engine start. Further, the method of FIG. 6 may adjust oil pressure supplied to one or more transmission clutches during an engine start based on vehicle acceleration during a previous engine start. FIGS. 3 and 5 are plots of example engine starts that the present method seeks to avoid, while FIG. 4 is an example engine start that the present method seeks to provide.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine starter 96 engages flywheel 98 which is coupled to crankshaft 40 to rotate crankshaft 40. Engine starter 96 may be engaged via a signal from controller 12. In some examples, engine starter 96 may be engaged without input from a driver dedicated engine stop/start command input (e.g., a key switch or pushbutton). Rather, engine starter 96 may be engaged when a driver releases a brake pedal or depresses accelerator pedal 130 (e.g., an input device that does not have a sole purpose of stopping and/or starting the engine). In this way, engine 10 may be automatically started via engine starter 96 to conserve fuel.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one example, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-directional Hall sensor or equivalent, the engine position may be maintained through shut-down, but during re-start alternative strategy may be used to assure that the engine is rotating in a forward direction.

FIG. 2 is a block diagram of a vehicle drive-train 200. Drive-train 200 may be powered by engine 10. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208 via transmission input shaft 236. Further, one or more clutches may be engaged, including forward clutch 210 and gear clutches 230, to propel a vehicle. In one example, the torque converter may be referred to as a component of the transmission. Further, transmission 208 may include a plurality of gear clutches 230 that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft 236 of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle via transmission output shaft 234. Specifically, automatic transmission 208 may transfer an input driving torque at the input shaft 236 responsive to a vehicle traveling condition before transmitting an output driving torque to the wheels.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

Transmission input speed may be monitored via transmission input shaft speed sensor 240. Transmission output speed may be monitored via transmission output shaft speed sensor 244. In some examples, accelerometer 250 may provide vehicle acceleration data to controller 12 so that clutches 210 and 230 may be controlled via valves 280-286 during engine starting and vehicle launch.

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or supercharged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate engine shutdown by shutting off fuel and spark to the engine. Further, to maintain an amount of torsion in the transmission, the controller may ground rotating elements of transmission 208 to a case of the transmission 238 and thereby to the frame of the vehicle. As further elaborated with reference to FIG. 6, the controller may engage one or more transmission clutches, such as forward clutch 210, and lock the engaged transmission clutch(es) to the transmission case and vehicle frame via electrically actuated valves 280-286. Valves 280-286 may be pulse width modulated control valves that control pressure of oil flowing to clutch 210 and gear clutches 230. In one example, during the engine shutdown, hydraulic pressure for clutch modulation may be provided by enabling the electric oil pump 220, if sufficient hydraulic pressure cannot be provided by the mechanical oil pump 214.

A wheel brake pressure may also be adjusted during the engine shutdown, based on the clutch pressure, to assist in tying up the transmission while reducing a torque transferred through the wheels. Specifically, by applying the wheel brakes while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When engine restart conditions are satisfied, and/or a vehicle operator wants to launch the vehicle, controller 12 may reactivate the engine by resuming cylinder combustion. As further elaborated with reference to FIG. 6, to launch the vehicle, transmission 208 may be unlocked and the wheel brakes 218 may be released, to return torque to the driving wheels 216. A clutch pressure may be adjusted to unlock the transmission via valves 280-286, while a wheel brake pressure may be adjusted to coordinate the release of the brakes with the unlocking of the transmission, and a launch of the vehicle.

Thus, the system of FIGS. 1 and 2 provides for controlling a transmission during an engine start, comprising: an engine; a transmission coupled to the engine, the transmission including a tie-up clutch that couples an input shaft of the transmission to a case of the transmission; an engine speed sensor; a transmission input shaft speed sensor; and controller including executable instructions stored in a non-transitory medium to adjust an oil pressure supplied to the tie-up clutch in response to a delay time between an output of the engine speed sensor and an output of the transmission input shaft speed sensor. In this way, transmission clutch tie-up may be reliably maintained.

The system includes where the tie-up clutch is a gear clutch, and further comprising an overrunning gear clutch. The system includes further instructions to adapt a parameter that adjusts the delay time. The system includes further instructions to adjust the oil pressure in response to an amount of amplitude of an oscillation output from the transmission input shaft speed sensor. The system also includes where the oil pressure is increased as the amount of amplitude of an oscillation output from the transmission input shaft speed sensor increases. In some examples, the system includes where the oil pressure is decreased as the oscillation amplitude amount of the output of the transmission input shaft speed sensor decreases.

Referring to FIG. 3, a plot of signals of interest during a simulated engine start is shown. The X axis represents time and time increases from the left side of the plot to the right side of the plot. The Y axis represents engine speed and transmission input shaft speed. Speed increases in the direction of the Y axis arrow. Curve 302 represents engine speed. Curve 304 represents transmission input shaft speed.

At the left side of the plot before a time of 136.5, the engine and transmission speed are zero indicating that the engine is stopped. Shortly thereafter, the engine is cranked via a starter motor and the engine starts as indicated by curve 302 increasing. Transmission shaft speed increases after engine speed begins to increase as indicated by curve 304. A delay time 306 occurs between when engine speed begins to increase due to combustion and when transmission input shaft speed begins to increase. The transmission input shaft speed may begin to increase when engine torque transmitted through the torque converter exceeds the forces holding the transmission input shaft stationary (e.g., transmission tie-up force grounding the input shaft to the transmission case, vehicle mass and road grade when a gear is engaged and the transmission is not tied up, or transmission internal friction when the transmission input shaft is not coupled to the transmission output shaft or the transmission case). The delay may be indicative of tie-up clutch slip.

The delay time 306 may be indicative of whether or not oil pressure supplied to the transmission tie-up clutch is sufficient to hold the transmission input shaft stationary. Further, the delay time may be indicative of a transmission lockup clutch that is not timely released. Shortening the delay time can provide the driver with a vehicle launch (e.g., initial vehicle acceleration from stop) that satisfies the driver's intent to start the vehicle moving. However, the delay time may only be shortened within limits or else the transmission may absorb less engine torque than is desired. If the transmission absorbs less engine torque the engine speed may increase above a desired engine speed during engine run-up from crank to idle speed.

Curves 320 and 322 represent the oscillation amplitude boundary of curve 304. In particular, curve 320 represents the upper oscillation transmission input shaft speed boundary. Curve 322 represents the lower oscillation transmission input shaft speed boundary. The oscillation boundaries may be determined via determining the peaks and valleys of curve 304. The distance between the peaks and valleys (e.g., distance between curves 320 and 322) is the oscillation amplitude. In this example, the oscillation amplitude begins large and decays as time increases. Such a response may be characterized as an under dampened response. An oscillating transmission input shaft speed may be noticeable to a driver of a vehicle in the form of non-uniform vehicle acceleration. Therefore, it may be desirable to reduce the oscillation amplitude of curve 304 and reduce the distance between curves 320 and 322.

Referring to FIG. 4, a plot of signals of interest during a simulated engine start is shown. The X axis represents time and time increases from the left side of the plot to the right side of the plot. The Y axis represents engine speed and transmission input shaft speed. Speed increases in the direction of the Y axis arrow. Curve 402 represents engine speed. Curve 404 represents transmission input shaft speed.

At the left side of the plot before a time of 158.8, the engine and transmission speed are zero indicating that the engine is stopped. Shortly thereafter, the engine is cranked via a starter motor and the engine starts as indicated by curve 402 increasing. Transmission shaft speed increases after engine speed begins to increase as indicated by curve 404. A delay time 406 occurs between when engine speed begins to increase due to combustion and when transmission input shaft speed begins to increase. Delay time 406 is relatively short in this example and provides vehicle launch in an acceptable time frame.

Curves 420 and 422 represent the oscillation amplitude boundary of curve 404. In this example, the oscillation amplitude boundary is narrow in width and therefore vehicle acceleration is more uniform and less objectionable as compared to when the transmission input shaft oscillates as shown in FIG. 3. In this example, curve 420 represents the upper oscillation amplitude transmission input shaft speed boundary. Curve 422 represents the lower oscillation amplitude transmission input shaft speed boundary. The oscillation amplitude boundary (e.g., distance between curves 420 and 422) is shown beginning small and decays further as time increases. A transmission input shaft that rotates with little oscillation amplitude as shown in FIG. 4 may be less noticeable to a driver of a vehicle. Consequently, it is desirable to reduce the oscillation amplitude amount of curve 404 as is shown in FIG. 4.

Referring to FIG. 5, a plot of signals of interest during a simulated engine start is shown. The X axis represents time and time increases from the left side of the plot to the right side of the plot. The Y axis represents engine speed and transmission input shaft speed. Speed increases in the direction of the Y axis arrow. Curve 502 represents engine speed. Curve 504 represents transmission input shaft speed.

At the left side of the plot near time of 17.5, the engine and transmission speed are zero indicating that the engine is stopped. Shortly thereafter, the engine is cranked via a starter motor and the engine starts as indicated by curve 502 increasing. Transmission shaft speed increases after engine speed begins to increase as indicated by curve 504. A delay time 506 occurs between when engine speed begins to increase due to combustion and when transmission input shaft speed begins to increase. Delay time 506 is relatively long in this example and provides a slower vehicle launch than is desired.

Curves 520 and 522 represent the oscillation amplitude boundary of curve 504. In this example, the oscillation amplitude boundary is narrow in width and therefore vehicle acceleration is more uniform and less objectionable as compared to when the transmission input shaft oscillates as shown in FIG. 3. However, the delay time makes the engine start of FIG. 5 less desirable. In this example, curve 520 represents the upper peak transmission input shaft speed boundary. Curve 522 represents the lower peak transmission input shaft speed boundary. The oscillation amplitude boundary (e.g., distance between curves 520 and 522) is shown beginning small and stays small as time increases. A transmission input shaft that rotates with little oscillation amplitude as shown in FIG. 5 may be less noticeable to a driver of a vehicle but the increased delay time makes the vehicle launch undesirable. Thus, the engine start and vehicle launch as indicated by transmission input shaft speed are less desirable than those shown in FIG. 4.

Referring now to FIG. 6, a flowchart of an example engine starting and transmission control method is shown. The method of FIG. 6 may be implemented in a controller as shown in FIGS. 1 and 2 via executable instructions.

Transmissions come in a variety of designs that may include overrunning clutches for first gear. The overrunning first gear clutch does not require supplying hydraulic pressure via oil to a first gear clutch in order to engage the clutch and accelerate a vehicle from rest. Thus, when an engine is started that is coupled to a transmission having an overrunning first gear clutch, the vehicle can be launched from a tied-up transmission state by simply releasing the tie-up or off-going clutch and applying engine torque to the driveline via the first gear clutch.

In other examples, a transmission may require controlling oil pressure to the first gear clutch in order to launch the vehicle in first gear. Therefore, when an engine is started that is coupled to a transmission that requires controlling oil pressure to all transmission clutches, the vehicle can be launched from a tied-up transmission state by releasing the tie-up or off-going clutch via reducing pressure of oil supplied to the off-going clutch and increasing pressure of oil supplied to the on-coming clutch (e.g., first gear clutch). Thus, the vehicle may be launched by controlling oil pressure supplied to two or more clutches when the transmission is untied.

The method of FIG. 6 applies to transmissions that include overrunning clutches and transmissions that do not include overrunning clutches. Therefore, the method of FIG. 6 is not limited to one type of transmission.

At 602, method 600 determines operating conditions. Operating conditions may include but are not limited to engine speed, engine time or cylinder events from stop, ambient temperature, transmission input shaft speed, transmission output shaft speed, road grade, transmission oil temperature, and engine load. Method 600 proceeds to 604 after operating conditions are determined.

At 604, method 600 judges whether or not an engine start request is present. In some examples, the transmission coupled to the engine is in a tied-up state while the engine is stopped and while a drive gear is selected by the driver. In one example, the transmission is tied-up when the input shaft of the transmission is coupled to the case of the transmission. The transmission input shaft may be coupled to the transmission case via applying one or more transmission clutches. For example, a forward clutch and third gear clutch may be simultaneously applied via increasing pressure of oil supplied to the clutches. Thus, in some examples, the transmission is tied-up when an engine start request is received.

An engine automatic start request may be received via a controller judging between different operating conditions whether or not to start an engine automatically (e.g., without a driver making an engine start request via a dedicated driver input that has the sole function of requesting engine stop or start). In some examples, an engine automatic start request may be provided when a driver depresses an accelerator pedal or releases a brake. If method 600 judges an engine start request is present, method 600 proceeds to 606. Otherwise, method 600 proceeds to exit.

At 606, method 600 engages the engine starter to rotate the engine. In some examples, the engine may be rotated via a motor supplying power to vehicle wheels or a motor that periodically charges batteries. Spark and fuel are supplied to the engine as the engine begins to rotate so as to initiate combustion in engine cylinders. Method 600 proceeds to 608 after the engine begins to rotate.

At 608, method 600 begins to track and record engine speed and transmission input shaft or transmission turbine speed. Engine speed and transmission input shaft speed may be tracked via converting engine and transmission position signals into engine speed and transmission input shaft speed. The engine speed and the transmission input shaft speed are recorded over time to controller memory. In some examples, output of an accelerometer may also be tracked via sampling output of an accelerometer and storing the accelerometer data to controller memory. The accelerometer may replace or augment the transmission input shaft speed signal. Method 600 proceeds to 610 after engine speed and transmission input shaft speed tracking begins.

At 610, method 600 releases the tie-up clutch. The tie-up clutch may be a gear clutch, third gear clutch for example. The tie-up clutch may be released after a predetermined amount of time since engine stop (e.g., when engine rotational speed is zero) while the engine is started or after a predetermined number of combustion events since engine stop. Alternatively, the tie-up clutch may be released after a predetermined amount of time since engine restart. Further, in some examples, release of the tie-up clutch may be advanced in time depending on a driver torque demand. For example, if an engine start request is generated via a driver releasing a brake pedal without requesting engine torque via an accelerator pedal, the tie-up clutch may be released in 1.5 seconds after the engine exceeds a threshold starting speed. However, if the driver releases the brake pedal and applies the accelerator shortly thereafter, the tie-up clutch may be released in 0.5 seconds after the engine exceeds the threshold engine starting speed from engine stop. In this way, the tie-up clutch may be released at a time that accommodates driver demand and automatic engine starting.

An on-coming clutch may also be applied at 610 by increasing oil pressure supplied to the on-coming clutch. The on-coming clutch may be applied at a predetermined time since engine stop (e.g., when engine speed is zero). Alternatively, the on-coming clutch may be applied at a predetermined time since engine restart. The on-coming clutch application may overlap with the off-going clutch release. In examples where there is an overrunning clutch, no oil pressure adjustments are made to launch the vehicle. Method 600 proceeds to 612 after the tie-up clutch is released.

At 612, method 600 determines the delay between engine speed and transmission input shaft speed. Attributes of transmission speed, engine speed, and vehicle acceleration may also be determined in real-time as time increases (e.g., as engine speed and transmission input speed data is stored to memory) or may be alternatively determined at a time when the controller has more processing time or is off-line with respect to controlling the engine and/or transmission.

The time delay between when engine speed increases and transmission input shaft increases may be determined via taking a difference between a time when engine speed exceeds a threshold speed and a time when the transmission input shaft speed exceeds a threshold speed while the engine is operating. The determined time delay for the automatic engine restart may be stored in memory.

Similarly, the oscillation amplitude in transmission input shaft speed may be determined by capturing transmission input shaft speed values and determining when the sign of the slope of the transmission input speed changes from positive to negative or vice-versa. Each time the transmission input shaft speed slope changes sign (e.g., positive to negative) a difference may be determined between the transmission input shaft speed at the present transmission input shaft speed slope sign change and the transmission input shaft speed at the last or previous transmission input shaft speed slope sign change. The difference yields an oscillation amplitude amount of the transmission input shaft speed. Alternatively, the transmission input shaft speed may be passed through a band-pass filter and the low values output from the filter may be subtracted from the high values output from the filter to provide an oscillation amplitude amount of transmission input shaft speed variation. In this way, the engine speed and transmission input shaft speed signals may be tracked and processed to determine delay between engine speed and transmission input shaft speed as well as attributes such as oscillation amplitude of the transmission input shaft speed. The transmission input shaft speed signal may be indicative of driveline oscillation.

In other examples, output of a vehicle accelerometer may be compared to the engine speed signal. For example, time delay between when engine speed increases and accelerometer output increases may be determined via taking a difference between a time when engine speed exceeds a threshold speed and a time when the accelerometer exceeds a threshold acceleration (e.g., is greater than zero) while the engine is operating. Similarly, the oscillation amplitude in accelerometer output may be determined by capturing accelerometer output and determining when the sign of the slope of the accelerometer output changes from positive to negative or vice-versa. Each time the accelerometer output slope changes sign (e.g., positive to negative) a difference may be determined between the accelerometer output at the present accelerometer slope sign change and the accelerometer output at the last or previous accelerometer output slope sign change. The difference yields an oscillation amplitude amount of the accelerometer output. In this way, the engine speed and accelerometer output signals may be tracked and processed to determine delay between engine speed and accelerometer output as well as attributes such as oscillation amplitude of the accelerometer output. Method 600 proceeds to 614 after delay time and peak-to-peak transmission input shaft speed are determined.

At 614, method 600 judges if there is a small delay time and large oscillation amplitude of the transmission input shaft speed or the accelerometer output. In one example, the delay time between engine speed and transmission input shaft speed is compared to a delay time that is desired for similar operating conditions. For example, at lower transmission temperatures the delay time may be 0.6 seconds may be desired while at nominal transmission operating temperatures the delay may be 0.3 seconds. Thus, if the delay time is 0.7 seconds at lower transmission temperatures the delay may be determined to be large. However, if the delay is determined to be 0.45 seconds as lower transmission temperatures, the delay may be determined to be small. Similarly, if a delay time of 0.25 seconds is determined at nominal transmission temperatures, the delay may be determined to be small. In this way, the delay time is compared to a threshold delay time, and if the delay time is greater than the threshold delay time by a predetermined amount of time, the delay time is determined to be large. Otherwise, the delay time may be determined to be small if the delay time is less than the threshold delay time by a predetermined amount of time.

Similarly, the oscillation amplitude amount of transmission input shaft speed or accelerometer output may be compared to values that are stored in memory to determine if the oscillation amplitude of vehicle acceleration and/or transmission input shaft speed are large. For example, the oscillation amplitude of transmission input shaft speed is compared to a transmission input shaft speed oscillation amplitude threshold stored in memory for similar operating conditions. In one example, at nominal transmission temperature the transmission input shaft speed oscillation threshold may be 300 RPM at a particular time since engine start. Note that transmission input shaft speed and accelerometer oscillation amplitude threshold limits may vary depending on operating conditions and time since engine start. Therefore, in some examples, a plurality of accelerometer or transmission input shaft speed desired oscillation amplitude limit values may be compared to the actual or measured transmission input shaft speed oscillation amplitude over the duration of a vehicle launch. For example, a different desired transmission input shaft speed oscillation amplitude amount may be provided and stored in memory for each 0.5 seconds after engine start. The actual transmission input shaft speed oscillation amplitude value or amount during each of the 0.5 second intervals of time may be compared (e.g., subtracted from the desired value) to a corresponding desired transmission input shaft speed oscillation amplitude amount stored in memory. If the actual oscillation amplitude amount exceeds the desired oscillation amplitude amount, it may be determined that the oscillation amplitude amount is large.

If the delay between engine speed and transmission input speed is small and the oscillation amplitude is large, method 600 proceeds to 616. Otherwise, method 600 proceeds to 618.

At 616, method 600 adaptively increases transmission clutch oil pressure for the one or more transmission tie-up clutches. In one example, base clutch oil pressures for transmission tie-up clutches are empirically determined and stored in memory. The clutch oil pressures may be indexed by transmission oil temperature, time or combustion events from engine stop, and road grade. Thus, if one of transmission oil temperature, time/combustion events from engine stop, and road grade are different from start to start, a unique tie-up clutch oil pressure may be extracted from memory. Further, clutch oil pressure adjustments for each of transmission oil temperature, time/combustion events from engine stop, and road grade may each be expressed in a function so that each function may be adaptively adjusted based on the delay between engine speed and transmission input shaft speed.

In one example, the base oil pressure may be determined to be 250 Kpa at nominal transmission oil temperature, for a predetermined number of combustion events from engine stop, and on a flat road. If the delay is small and the oscillation amplitude is large, the base oil pressure may be incrementally increased by a predetermined amount (e.g., 10 Kpa). However, if the transmission temperature is 20° C. less than nominal transmission temperature and the delay is small and the oscillation amplitude is large, the transmission adjustment function value corresponding to the present transmission temperature may be incrementally increased by a predetermined amount (e.g., by 0.5%). In this way, the base tie-up clutch pressure and adjustment parameters may be adaptively increased to increase the delay time between engine speed and transmission input shaft speed. Method 600 proceeds to exit after the tie-up clutch pressure commands are adaptively adjusted.

The revised tie-up clutch oil pressures may be commanded via adjusting a duty cycle supplied to a valve supplying oil to the tie-up clutch. The oil pressure adjustments determined from delay time and oscillation amplitude during a first engine start are applied during a subsequent engine start so that the subsequent engine start maybe improved.

At 618, method 600 judges if there is a large delay time and small oscillation amplitude amount of the transmission input shaft speed or the accelerometer output. In particular, the delay time is compared to a threshold delay time, and if the delay time is less than the threshold delay time by a predetermined amount of time, the delay time is determined to be small. Otherwise, the delay time may be determined to be large if the delay time is greater than the threshold delay time by a predetermined amount of time.

Similarly, the oscillation amplitude amount of transmission input shaft speed or accelerometer output may be compared to values that are stored in memory to determine if the oscillations amplitude of vehicle acceleration or transmission input shaft speed are small. If the actual oscillation amplitude amount is less than the desired oscillation amplitude amount, it may be determined that the oscillation amplitude amount is small.

If the delay between engine speed and transmission input speed is large, the transmission input shaft oscillation is small, and there is sustained vehicle acceleration after the delay (e.g., the vehicle accelerates for a predetermined amount of time after the delay), method 600 proceeds to 620. Otherwise, method 600 proceeds to exit.

At 620, method 600 adaptively decreases transmission clutch oil pressure for the one or more transmission tie-up clutches. As discussed at 616, the base clutch oil pressures for transmission tie-up clutches are empirically determined and stored in memory. The clutch oil pressures may be indexed by transmission oil temperature, time or combustion events from engine stop, and road grade. Therefore, if one of transmission oil temperature, time/combustion events from engine stop, and road grade are different from start to start, a unique tie-up clutch oil pressure may be extracted from memory. Further, clutch oil pressure adjustments for each of transmission oil temperature, time/combustion events from engine stop, and road grade may each be expressed in a function so that each function may be adaptively adjusted based on the delay between engine speed and transmission input shaft speed.

In the example discussed at 616, the base oil pressure may be determined to be 250 Kpa at nominal transmission oil temperature, for a predetermined number of combustion events from engine stop, and on a flat road. If the delay is large and the oscillation is small during sustained vehicle acceleration, the base oil pressure may be incrementally decreased by a predetermined amount (e.g., 10 Kpa). However, if the transmission temperature is 20° C. less than nominal transmission temperature and the delay is large and the oscillation is small, the transmission adjustment function value corresponding to the present transmission temperature may be incrementally decreased by a predetermined amount (e.g., by 0.5%). In this way, the base tie-up clutch pressure and adjustment parameters may be adaptively decreased to decrease the delay time between engine speed and transmission input shaft speed. Method 600 proceeds to exit after the tie-up clutch pressure commands are adaptively adjusted.

The revised tie-up clutch oil pressures may be commanded via adjusting a duty cycle supplied to a valve supplying oil to the tie-up clutch. The oil pressure adjustments determined from delay time and oscillation amplitude during a first engine start are applied during a subsequent engine start so that the subsequent engine start may be improved.

In this way, the method of FIG. 6 provides for adaptively adjusting oil pressure supplied to transmission tie-up clutches. The method may provide more consistent tie-up clutch control between different vehicles. Further, the method may be accomplished with commonly used engine and transmission speed sensors.

Thus, the method of FIG. 6 provides for a method for controlling a transmission coupled to an engine during an engine start, comprising: applying a first pressure to a clutch tying a transmission input shaft to a transmission case during a first engine start; and applying a second pressure to the clutch tying the transmission input shaft to the transmission case during a second engine start. The method includes where the first engine start is during a first set of conditions and where the second engine start is during a second set of conditions, the second set of conditions substantially equivalent to the first set of conditions. In this way, transmission clutch oil pressure may be adjusted to account for system variability.

The method also includes where the second pressure is applied based on the first pressure and an operating condition of the transmission. The method also includes where the operating condition of the transmission is an input shaft speed of the transmission. In some examples, the method further comprises releasing the clutch via reducing the second pressure after a predetermined time since engine stop. The method includes where the first and second pressures are applied via adjusting a duty cycle supplied to a valve. The method also includes where the clutch tying the transmission input shaft to the transmission case is a gear clutch, and where the first pressure is different than the second pressure, and further comprising where an amount of the first pressure is adjusted to provide the second pressure.

The method of FIG. 6 also provides for controlling a transmission coupled to an engine during an engine start, comprising: applying a first clutch to tie a transmission input shaft to a transmission case during a first engine start; and adjusting an oil pressure supplied to the first clutch during a second engine start in response to a delay time between engine speed and an indication of transmission input shaft acceleration during the first engine start. The method also includes where the first clutch is a gear clutch, and where the indication of transmission input shaft acceleration is output of an accelerometer or output of a transmission input shaft speed sensor. In this way, tie-up of the transmission may be made more consistent.

The method further comprises adjusting the oil pressure supplied to the first clutch during the second engine start in response to an oscillation amplitude amount of a transmission input shaft speed. The method further comprises releasing the first clutch after a predetermined condition. In some example, the method includes where the oil pressure is increased during the second engine start when the delay time is less than a threshold amount of time. The method also includes where the oil pressure is decreased during the second engine start when the delay time is greater than a threshold amount of time. The method further comprises releasing the first clutch during the second engine start and applying a second clutch, the second clutch providing engine torque to vehicle wheels to accelerate a vehicle after the first clutch is released.

As will be appreciated by one of ordinary skill in the art, routines described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling a transmission coupled to an engine during an engine start, comprising:

applying a first pressure to a clutch tying a transmission input shaft to a transmission case during a first engine start; and applying a second pressure to the clutch tying the transmission input shaft to the transmission case during a second engine start, where the clutch tying the transmission input shaft to the transmission case is a gear clutch, and where the first pressure is different than the second pressure, and further comprising where an amount of the first pressure is adjusted to provide the second pressure.

2. The method of claim 1, where the first engine start is during a first set of conditions and where the second engine start is during a second set of conditions, the second set of conditions substantially equivalent to the first set of conditions.

3. The method of claim 1, where the second pressure is applied based on the first pressure and an operating condition of the transmission.

4. The method of claim 3, where the operating condition of the transmission is an input shaft speed of the transmission.

5. The method of claim 1, further comprising releasing the clutch via reducing the second pressure after a predetermined time since engine stop.

6. The method of claim 1, where the first and second pressures are applied via adjusting a duty cycle supplied to a valve.

7. A method for controlling a transmission coupled to an engine during an engine start, comprising:

applying a first clutch to tie a transmission input shaft to a transmission case during a first engine start; and adjusting an oil pressure supplied to the first clutch during a second engine start in response to a delay time between engine speed and an indication of transmission input shaft acceleration during the first engine start, the engine coupled to the transmission through a torque converter.

8. The method of claim 7, where the first clutch is a gear clutch, and where the indication of transmission input shaft acceleration is output of an accelerometer or output of a transmission input shaft speed sensor.

9. The method of claim 7, further comprising adjusting the oil pressure supplied to the first clutch during the second engine start in response to an oscillation amplitude amount of a transmission input shaft speed.

10. The method of claim 7, further comprising releasing the first clutch after a predetermined condition.

11. The method of claim 7, where the oil pressure is increased during the second engine start when the delay time is less than a threshold amount of time.

12. The method of claim 7, where the oil pressure is decreased during the second engine start when the delay time is greater than a threshold amount of time.

13. The method of claim 12, further comprising releasing the first clutch during the second engine start and applying a second clutch, the second clutch providing engine torque to vehicle wheels to accelerate a vehicle after the first clutch is released.

14. A system for controlling a transmission during an engine start, comprising:

an engine;

a transmission coupled to the engine through a torque converter, the transmission including a tie-up clutch that couples an input shaft of the transmission to a case of the transmission;

an engine speed sensor;

a transmission input shaft speed sensor; and a controller including executable instructions stored in a non-transitory medium to adjust an oil pressure supplied to the tie-up clutch in response to a delay time between an output of the engine speed sensor and an output of the transmission input shaft speed sensor.

15. The system of claim 14, where the tie-up clutch is a gear clutch, and further comprising an overrunning gear clutch.

16. The system of claim 14, including further instructions to adapt a parameter that adjusts the delay time.

17. The system of claim 14, including further instructions to adjust the oil pressure in response to an oscillation amplitude amount of the output of the transmission input shaft speed sensor.

18. The system of claim 17, where the oil pressure is increased as the oscillation amplitude amount of the output of the transmission input shaft speed sensor increases.

19. The system of claim 17, where the oil pressure is decreased as the oscillation amplitude amount of the output of the transmission input shaft speed sensor decreases.

* * * * *